Patented May 31, 1938

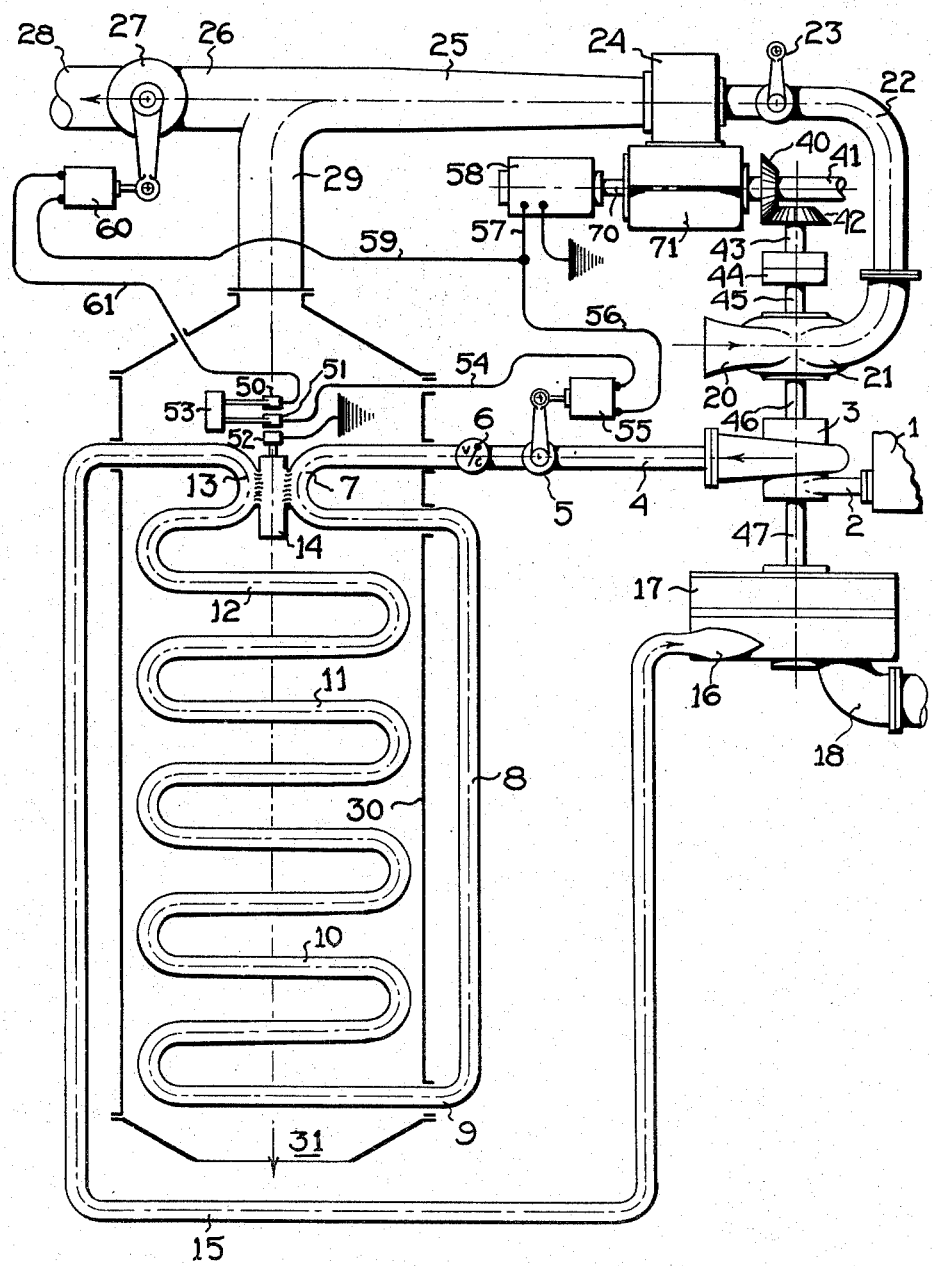

2,119,245

UNITED STATES PATENT OFFICE 2,119,245

BOILER REGULATION

Nathan C. Price, Berkeley, Calif., assignor to Sirius Corporation, a corporation of California Application December 18, 1936, Serial No. 116,609

12 Claims. (Cl. 122—451.1)

My invention comprises a new system for controlling the supply instrumentalities for boilers.

This boiler regulation has been found of especial value in high output forced circulation series tube vapor generators of the long tube type.

The heat storage capacity in all parts of these generators is very small so that vapor must be progressively formed as it is needed. These boilers are further characterized by extreme lightness, compactness and ability to safely produce steam of elevated temperatures and pressures.

By use of high velocities of gases of combustion about the tube, high rates of flow of boiler fluid within the tube, and special tube alloys, rates of heat transfer many times larger than those employed in past boiler practice may be advantageously maintained provided the control difficulties will be met.

It is imperative that appropriate boiler fluid conditions be produced in the long boiler tube simultaneously along its entire length from inlet through the economizer region, evaporation region, superheater, and to the outlet. Otherwise it will be unable to respond to load demands without excessive variation of outlet temperature and pressure and danger of localized failure somewhere along the tube length.

It is furthermore essential in such a generator that the control mechanism of the boiler supply instrumentalities be made light, compact, and reliable.

Accordingly it is the object of my boiler regulation to satisfy the aforementioned requirements by means of the herein described regulation of the supply of the feed liquid and the heating medium.

In Figure 1 is diagrammatically revealed an application of my boiler regulation to a steam generator, providing a waste heat utilization plant for an internal combustion engine. The steam formed in the generator operates a turbine for driving the internal combustion engine air supercharger.

The revealed power plant combination satisfies high altitude aircraft power requirements. Due to low atmospheric density at altitudes the power which must be supplied to the supercharger is a comparatively large portion of the total power development of the internal combustion engine. This power is provided by the waste heat utilization steam power plant in appropriate amount and with a considerable gain in fuel economy.

The boiler regulation is accomplished by a thermostat in continuous thermal junction with the feed liquid to the boiler and also in continuous thermal junction to the outlet vapor from the boiler. The thermostat is preferably exposed to the heating gases also.

The thermostat controls the boiler supply instrumentalities in a manner to keep the thermostat temperature approximately constant. This results in approximately constant outlet vapor conditions for the following reasons.

The rates of heat transfer between the thermostat and either the feed liquid, the outlet vapor, or the heating gases are in each case proportional to the heat transfer area between the fluid and the thermostat, to the specific film resistance coefficient between the fluid and the thermostat, and to the temperature difference between the fluid and the thermostat.

The area for heat transfer is in each case fixed and likewise the thermostat temperature must remain approximately constant. The quantum of heat flow from the outlet vapor and from the gases into the thermostat approximates the quantum of heat flow from the thermostat to the feed liquid.

The specific film resistance coefficient in each case depends upon 1, the type of fluid flow whether filamentous or turbulent, 2, certain inherent fluid qualities such as viscosity, specific heat, and thermal conductivity, and 3, the mass flow in the given fluid passage area. Within the limits of precision of control which are established in my boiler regulation, items 1 and 2 are essentially invariable. The relative mass flows of the fluids are therefore varied to maintain appropriate outlet temperature of the outlet vapor.

Accordingly it will be found that if, at a given mass flow of the outlet vapor, the temperature of the outlet vapor will tend to rise, then the thermostat must maintain its own temperature constant by increasing the mass flow of the feed liquid.

Furthermore if at a constant outlet temperature the mass flow of the outlet vapor will increase, then the thermostat must maintain its own temperature constant by increasing the mass flow of the feed liquid.

Also if the mass flow of the heating gases or the temperature of the heating gases will be increased, the thermostat will similarly increase the mass flow of the feed liquid.

In like manner the temperature of the feed water prior to its heat exchanging relationship to the thermostat modifies the control so that at higher feed liquid inlet temperatures the flow of the feedwater will be made slightly greater.

Inherent boiler stability is thereby produced.

The designations in Figure 1 are as follows:—

An internal combustion engine cylinder bank 24 is shown with its crankcase 71. Hot exhaust gases from the cylinder bank 24 are discharged into an exhaust conduit 25 and then flow through a conduit 29, a steam generator casing 30, and a flue 31 to the atmosphere.

In the boiler fluid circuit a feedwater supply tank 1 is connected to a centrifugal feedwater pump 3 by a conduit 2. The flow course from the pump 3 is continued through a conduit 4, a throttling flow control valve 5, a boiler inlet check valve 6, an inlet feedwater loop 7, a transfer conduit 8, an inlet 9, an economizer section 10, an evaporation section 11, a superheater 12, an outlet steam loop 13, a turbine supply conduit 15, and a turbine nozzle 16.

The steam releases its energy in a steam turbine 17, to cause rotation of a shaft 47, and is finally exhausted from a discharge 18 to the condensing system.

The power transmitted along the shaft 47 causes the feed pump 3 to function and also provides power in a shaft 46 for the rotation of a centrifugal air supercharger 21.

The air admitted to the supercharger 21 through an air ram 20 is conducted by an induction system 22 through a manually operated throttle 23 into the internal combustion cylinder bank 24.

From the crankcase 71 extends an engine propeller shaft 41 upon which a drive gear 40 is mounted. When the internal combustion engine is operating the motion of the gear 40 is transmitted to a gear 42 causing a shaft 43 to rotate. The power so imparted to shaft 43 is delivered to a shaft 45 through a uni-directional or overrunning clutch 44 for driving the supercharger 21 and the feed pump 3.

The boiler regulation system comprises the following: A thermostat 14 is thermally connected by welds or other appropriate method on its one side to the inlet feedwater loop 7, and on its other side to the outlet steam loop 13. The thermostat 14 actuates a grounded electrical contact 52 in combined accordance with the temperature, conductivity, and flow conditions in the exhaust gases, in the loop 7, and in the loop 13. An electrical generator 58 is driven from the engine crankcase 71 by a shaft 70. Current may be conducted from the generator 58 along a lead 57 and a lead 56 to a solenoid 55, for operation of the flow control valve 5. The remainder of this electrical circuit comprises a lead 54, and an electrical contact 51 flexibly connected to an insulating block 53.

Current may also be conducted from the lead 57 along a lead 59 to supply a solenoid 60 for regulation of a throttling exhaust gas flow control valve 27. The continuation of this latter electrical circuit comprises a lead 61 connected to an electrical contact 50 attached to the insulating block 53.

The behavior of this power plant system is now as follows: When the internal combustion engine is started, air is brought into the ram 20 through the supercharger 21, through the induction system 22, and through the induction system throttle 23 to supply the cylinder bank 24 in accordance with the setting of the throttle 23.

Also current supply becomes available in the lead 57 from the operation of the generator 58.

The gear 40 mounted on the propeller shaft 41 simultaneously drives the supercharger 21, the feedwater pump 3, and the steam turbine 17 at a relatively low speed through the overrunning clutch 44.

Exhaust gases from the cylinder bank 24 commence to flow in the conduit 25, in the conduit 29, through the casing 30, and out the flue 31.

During the first few moments of running of the internal combustion engine the thermostat 14 is cold, in accordance with which condition the contacts 52, 51, and 50 are in separation. The electrical circuits therefore are incompleted. The flow control valve 5 exists in closed position preventing feed liquid flow to the boiler inlet 9 and the flow control valve 27 exists in closed position preventing exhaust gases from being bypassed from the conduit 25 along a conduit 26 and out an exhaust conduit 28.

As the thermostat 14 becomes heated by the flow of exhaust gases in the casing 30 and reaches a predetermined temperature, the contact 52 is forced into junction with the contact 51. This causes completion of the electrical circuit which includes the solenoid 55, and the flow control valve 5 is thereby opened. The boiler is then fed by liquid, and steam generation commences.

This steam causes the turbine 17 to operate under its own power at a high speed, picking up the load of the feedwater pump 3 and that of the supercharger 21. High supercharger pressure is then made available to the internal combustion engine as a product of waste heat utilization from the internal combustion engine.

The particular boiler regulation which prevents cyclical tendencies from occurring in the steam generator is now further discussed. If, during a continuous operation of the boiler, the flow of feed liquid through the loop 7 shall be in excess of the boiler requirements for approximately constant outlet temperature and pressure in the loop 13, then the thermostat 14 comes comparatively more under the thermal influence of the feedwater. The thermostat 14 is thereby sufficiently cooled to cause withdrawal at a predetermined temperature, of the contact 52 from the contact 51. Deenergization of the solenoid 55, and the consequent closing of the feedwater control valve 5 results.

Then the thermostat 14 falls relatively more under the thermal influence of the outlet steam tube loop 13. The junction between the electrical contact 51 and 52 is then reestablished to reopen the feedwater control valve 5.

This continuous hunting of the thermostat about a predetermined temperature to which it is set causes governing of the flow of the feedwater in a manner appropriate to the maintenance of the correct position of the evaporation zone 11 for each condition of heat supply to the steam generator. Consequently the outlet steam is maintained at the appropriate state point for efficient operation of the turbine 17.

While a pressure control in the outlet steam may in certain instances be advantageously used in complement to the thermostat 14 for limiting the feedwater flow for closer boiler pressure regulation, it is not entirely necessary. The delivery of the centrifugal pump 3 automatically drops with greater discharge pressures. Furthermore a regulating effect exists in the thermostat 14 in accordance with boiler pressure. Under a condition of constant outlet temperature and constant outlet mass flow in the loop 13, any increase in pressure must reduce the velocity of the steam in the loop 13. Due to this compressibility of the steam in loop 13 and the relatively incompressibility of the feed liquid in loop 7, the temperature of the thermostat 14 more closely approaches that of the loop 7. Accordingly the thermostat 14 tends to become cooled and halts the flow of feedwater.

Control instability characterized by alternate pressure and temperature surges is thereby prevented.

The following exhaust gas bypass control system is provided in the event that the maximum feedwater supply available from the feed pump 3 shall at any time become deficient in comparison to the internal combustion engine exhaust gas flow through the conduit 25.

At an elevated thermostat temperature, the contact 52 will become so far advanced against the contact 51 by the action of the thermostat 14 that the flexibly mounted contact 51 will be brought in junction with the contact 50. The electrical circuit including the solenoid 60 will be thereby energized causing the opening of the exhaust gas flow control valve 27. Exhaust gases will then flow in preference out the exhaust conduit 28 instead of through the casing 30 due to obstructing effects of the boiler coils, thereby preventing overstressing of the boiler tubing and high temperature damage to the turbine 17.

It is to be understood that I do not limit myself to the exact form of the boiler controls shown and described herein, as the invention, as set forth in the following claims, may be embodied in a plurality of forms.

I claim:

1. A boiler control comprising a series tube vapor generator, and means for supplying feed liquid thereto in accordance with the relative thermal conditions of the liquid in the economizer section thereof as compared to the thermal conditions of the vapor in the superheater section thereof.

2. A boiler control comprising a series tube vapor generator, and means for supplying the feed liquid thereto in accordance with the relative heat exchanging capability of said feed liquid as compared to the heat exchanging capability of the outlet vapor formed in said generator.

3. A boiler control comprising a series tube vapor generator, and thermostatic means for controlling the feed liquid supply to said generator, said thermostatic means heated by the outlet vapor of said generator and cooled by the feed liquid to said generator and thermally sensitive during any tendency for change of generator pressure to the relative change of specific volume and accordingly to the resultant relative change of velocity of said vapor as compared to that of said liquid, thereby tending to stabilize said generator.

4. A boiler control comprising a vapor generator, means for bringing the feed liquid for said generator into preliminary thermal contact with the discharged vapor of said generator thereby causing a flow of heat from said vapor to said liquid, and thermostatic means responsive to said heat flow for regulating the boiler supply instrumentalities.

5. A vapor generation control system comprising an imperforate long heated boiler tube having an inlet at one end and an outlet at the other end thereof, thermal contact between said inlet end and said outlet end, feed liquid supplying means for said inlet, and thermostatic means in thermal contact with said inlet and in thermal contact with said outlet for controlling said heating means and said feed liquid supplying means.

6. A vapor generation control system comprising a long heated tube having an inlet at one end and an outlet at the other end thereof, means for supplying feed liquid to said inlet, and means thermally responsive to the relative rate of fluid flow in said inlet as compared to that from said outlet for controlling said liquid supplying means.

7. A boiler control for a steam generator characterized by a long heated tube having an inlet and an outlet, a heat exchanger intermediate the ends of said tube, a thermostat adjacent said heat exchanger and thermally responsive thereto, and means under control of said thermostat for forcing liquid to flow through said heat exchanger for a first heat interchanging relationship with said heat exchanger and thence directly into and through said tube for a second heat interchanging relationship with said heat exchanger.

8. A boiler control for a boiler characterized by a long, heated tube having an inlet and an outlet, comprising means for introducing feed fluid into said inlet, means for transferring heat from said outlet to said feed fluid, means for introducing said feed fluid without material change of pressure and temperature into said inlet, and thermostatic means responsive to the rate of said heat transfer for controlling the flow of said feed fluid into said inlet.

9. A boiler control for a boiler characterized by a long, heated tube the interior of which is under superatmospheric pressure and having an inlet and an outlet between which the temperature increases in the direction of the outlet, comprising means for introducing feed liquid into said inlet, means operating substantially at said tube pressure for transferring heat from an elevated temperature portion of said tube beyond said inlet back to the inlet portion thereof, means for regulating the supply of said feed liquid into said inlet, and thermostatic means responsive to said heat transfer for controlling said regulating means.

10. A boiler control for a boiler characterized by a long, heated tube having an inlet and an outlet between which the temperature increases in the direction of the outlet, means for forcing feed liquid to absorb heat from an elevated temperature portion of said tube beyond said inlet, means sensitive to the rate at which said heat is absorbed, and means under control of said sensitive means for thence forcing said feed liquid directly into said inlet.

11. A boiler control comprising a vapor generating tube, and means for maintaining a desired condition of the discharged vapor thereof by a thermostatic device sensitive to thermal conditions in a plurality of serial portions of said tube, said portions characterized by temperature of each progressively increasing in the direction of the outlet of said tube.

12. A boiler control for a boiler characterized by a long heated tube having an inlet and an outlet between which the temperature increases in the direction of the outlet, means for inducing a medium to accomplish a first exchange of heat with a portion of said tube beyond the evaporation zone of said tube, and to accomplish a second exchange of heat with a portion of said tube before the evaporation zone of said tube, means sensitive to the relative magnitude of said first and said second exchange for controlling a supply instrumentality of said boiler to maintain a condition in said boiler.

NATHAN C. PRICE.